United States Patent
Sugimoto

(10) Patent No.: US 11,853,991 B2
(45) Date of Patent: Dec. 26, 2023

(54) ACCOUNTING APPARATUS AND METHOD OF CONTROLLING AN ACCOUNTING APPARATUS

(71) Applicant: TOSHIBA TEC KABUSHIKI KAISHA, Tokyo (JP)

(72) Inventor: Takashi Sugimoto, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 134 days.

(21) Appl. No.: 17/125,800

(22) Filed: Dec. 17, 2020

(65) Prior Publication Data
US 2021/0264396 A1    Aug. 26, 2021

(30) Foreign Application Priority Data

Feb. 25, 2020 (JP) .................. 2020-029638

(51) Int. Cl.
```
G06Q 20/20      (2012.01)
G06Q 40/12      (2023.01)
G07F 5/24       (2006.01)
G05B 23/02      (2006.01)
G07D 11/237     (2019.01)
G07D 11/16      (2019.01)
G07D 11/23      (2019.01)
```
(Continued)

(52) U.S. Cl.
CPC ....... *G06Q 20/203* (2013.01); *G05B 23/0259* (2013.01); *G06Q 20/204* (2013.01); *G06Q 20/209* (2013.01); *G06Q 40/12* (2013.12); *G07D 11/16* (2019.01); *G07D 11/23* (2019.01); *G07D 11/237* (2019.01); *G07F 5/24* (2013.01); *G06F 3/04842* (2013.01); *G07D 11/14* (2019.01); *G07D 2201/00* (2013.01); *G07D 2211/00* (2013.01)

(58) Field of Classification Search
None
See application file for complete search history.

(56) References Cited

U.S. PATENT DOCUMENTS 5,088,586 A * 2/1992 Isobe ................. G06Q 20/204
                                                         705/17
5,842,188 A * 11/1998 Ramsey ............... G07F 13/025
                                                         705/416
(Continued)

FOREIGN PATENT DOCUMENTS

| JP | 2002-150324 A | 5/2002 |
| JP | 2010-165076 A | 7/2010 |
| JP | 2013-127711 A | 6/2013 |

OTHER PUBLICATIONS

Japanese Office Action dated Sep. 19, 2023 in related Japanese Patent Application 2020-029638, 6 pages.

*Primary Examiner* — Fateh M Obaid
(74) *Attorney, Agent, or Firm* — Kim & Stewart LLP

(57) ABSTRACT

According to an embodiment, an accounting apparatus includes a change machine, a detection device, and a controller. The controller determines whether or not the change machine is capable of paying change in cash on the basis of a result of a detection by the detection device. The controller accepts, when determining that the change machine fails to pay the change in cash, a payment method selected by a customer from a plurality of change payment methods other than paying in cash.

5 Claims, 14 Drawing Sheets

(51) Int. Cl.
    *G06F 3/04842*     (2022.01)
    *G07D 11/14*       (2019.01)

(56)            References Cited

U.S. PATENT DOCUMENTS

| | | | |
|---|---|---|---|
| 8,387,864 B1* | 3/2013 | Blackson | G06Q 20/0457 |
| | | | 235/379 |
| 10,510,052 B2* | 12/2019 | Kanisawa | G06Q 20/00 |
| 2005/0059452 A1* | 3/2005 | Hartl | G07F 17/3244 |
| | | | 463/13 |
| 2006/0026156 A1* | 2/2006 | Zuleba | G06F 21/6227 |
| | | | 707/999.005 |
| 2008/0120129 A1* | 5/2008 | Seubert | G06Q 40/125 |
| | | | 705/305 |
| 2009/0138458 A1* | 5/2009 | Wanker | G06F 16/951 |
| | | | 707/999.005 |
| 2012/0116956 A1* | 5/2012 | Altman | G06Q 40/00 |
| | | | 705/39 |
| 2016/0232506 A1* | 8/2016 | Gotanda | G06Q 20/047 |
| 2016/0328692 A1* | 11/2016 | Camps | G06Q 20/3223 |
| 2018/0165666 A1* | 6/2018 | Inoue | G06Q 20/204 |
| 2020/0380489 A1* | 12/2020 | Saitoh | G06Q 20/405 |
| 2021/0074113 A1* | 3/2021 | Uehata | G07F 7/02 |

* cited by examiner

212a

| DENOMINATION (YEN) | NUMBER OF BILLS AND COINS | THRESHOLD VALUE |
|---|---|---|
| 1 | 30 | 10 |
| 5 | 15 | 2 |
| 10 | 50 | 10 |
| 50 | 50 | 2 |
| 100 | 80 | 10 |
| 500 | 25 | 2 |
| 1,000 | 70 | 10 |
| 2,000 | 0 | — |
| 5,000 | 20 | 2 |
| 10,000 | 30 | — |

| DISPLAY NO. | STATUS OF CHANGE MACHINE | PAYMENT METHOD 1 | PAYMENT METHOD 2 | PAYMENT METHOD 3 | PAYMENT METHOD 4 |
|---|---|---|---|---|---|
| 1 | SHORTAGE OF CHANGE | ELECTRONIC MONEY | POINT | VOUCHER | REFUND, PAYMENT SELECTION SCREEN |
| 2 | CONVEYANCE MALFUNCTION | ELECTRONIC MONEY | POINT | VOUCHER | — |

213a

ACCOUNTING APPARATUS AND METHOD OF CONTROLLING AN ACCOUNTING APPARATUS

CROSS-REFERENCE TO RELATED APPLICATIONS

This application is based upon and claims the benefit of priority from the prior Japanese Patent Application No. 2020-029638, filed on Feb. 25, 2020, the entire contents of which are incorporated herein by reference.

FIELD

Embodiments described herein generally relate to an accounting apparatus and a method of controlling an accounting apparatus.

BACKGROUND

A point-of-sale (POS) terminal operated by a store clerk or a customer in a retail store or the like includes an accounting apparatus for accounting relating to transactions. The accounting apparatus performs accounting processing on the basis of transaction data. The accounting apparatus includes a change machine for dispensing the change calculated in the transaction in cash. The change machine receives and stocks the bills and coins paid by a customer when the customer pays for purchase in cash, and dispenses the change in stocked cash when change occurs.

As this type of accounting apparatus carries out more transactions, the shortage of change is more likely to occur, for example, when the number of a specific denomination, e.g., 100-yen coins, stocked in the change machine is reduced. This may result in a case where the change fails to be paid (dispensed) in cash. Further, there may also be a case where the change fails to be paid due to a malfunction of a mechanism for conveying the cash for change in the change machine, or the like.

There has been known a commuter pass issuing machine that is capable of continuing to sell commuter passes even if the change fails to be paid due to the shortage of change. If the shortage of change occurs when a customer purchases a commuter pass, the commuter pass issuing machine records the change amount in the commuter pass. The customer can receive the change in cash dispensed from station service equipment by inserting the commuter pass, in which the change amount is recorded, into the station service equipment.

The above-mentioned technology provides an alternative method of paying the change in cash when the shortage of change occurs, but the technology has difficulty in coping with a user's desire, a status of the change machine, and the like depending on the situations.

BRIEF DESCRIPTION OF THE DRAWINGS

FIG. 5 is a diagram showing a data structure of a denomination-based table stored in a memory device of the accounting apparatus according to the first embodiment.

FIG. 6 is a diagram showing a data structure of a display table stored in the memory device of the accounting apparatus according to the first embodiment.

DETAILED DESCRIPTION

According to one embodiment, an accounting apparatus performs accounting processing on the basis of transaction data. The accounting apparatus includes a change machine, a detection device, and a controller. The change machine pays a customer change in stocked cash. The detection device detects a status of the change machine. The controller determines whether or not the change machine is capable of paying the change in cash on the basis of a result of the detection by the detection device. The controller accepts, when determining that the change machine fails to pay the change in cash, a payment method selected by the customer from a plurality of change payment methods other than paying in cash. Further, the controller performs change payment processing by the accepted payment method.

First Embodiment

Figure 1:
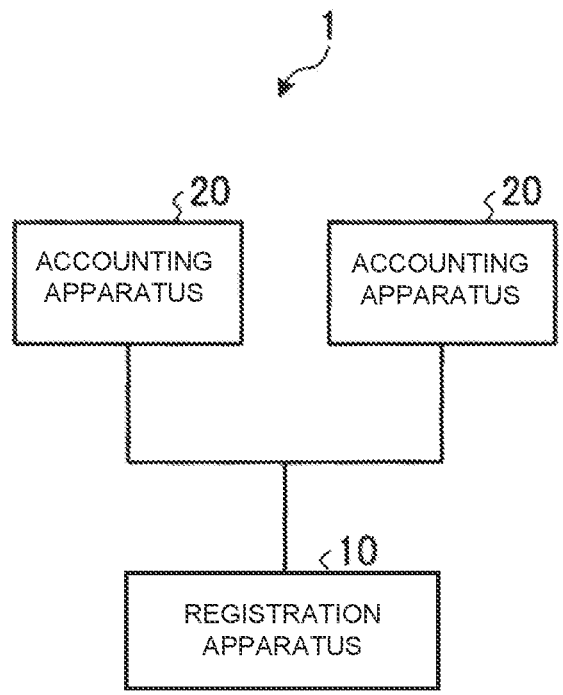
FIG. 1 is a diagram showing an accounting system including an accounting apparatus according to a first embodiment.

An accounting apparatus of a first embodiment will be described below with reference to FIGS. 1 to 10. In the figures, the same reference symbol represents the same or similar portion. FIG. 1 is a diagram showing a configuration of an accounting system 1. The accounting system 1 is employed in a supermarket and the like, and includes a registration apparatus 10 and a plurality of accounting apparatuses 20 connected to the registration apparatus 10 via a network. The accounting system 1 is a so-called semi-self-type accounting system in which a store clerk performs processing for sales registration of a commodity (hereinafter, also referred to as commodity registration processing) using the registration apparatus 10, and a customer pays for the commodity, for which the commodity registration processing has been performed, using the accounting apparatus 20.

Figure 2:
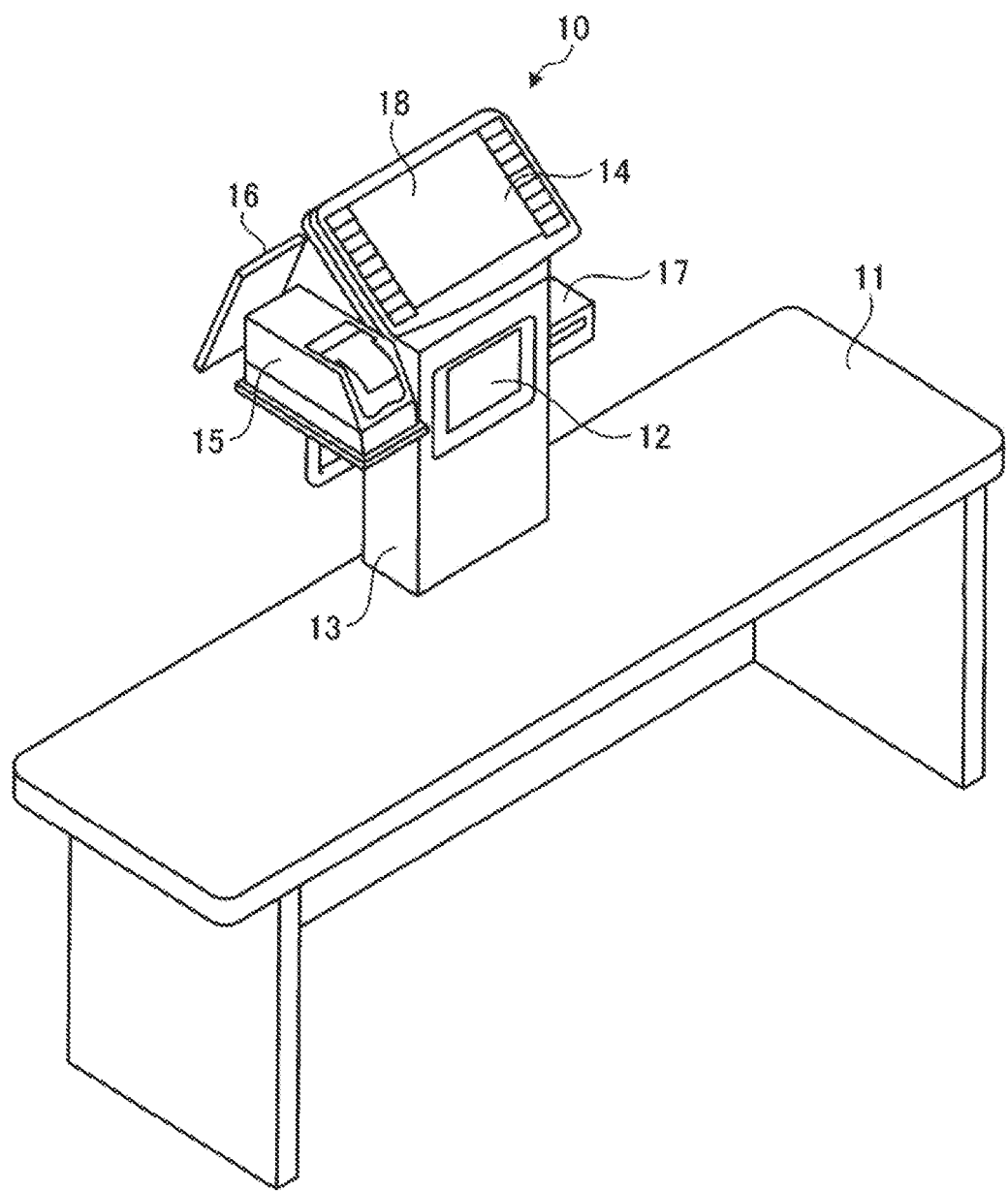
FIG. 2 is a view showing an appearance of a registration apparatus according to the first embodiment.

FIG. 2 is a perspective view showing the appearance of the registration apparatus 10. As shown in FIG. 2, the registration apparatus 10 is installed on the upper surface of a counter 11 where a store clerk is located. The registration apparatus 10 is formed with a vertical scanner 13 including a reading window 12 being as a base. The scanner 13 captures an image of a code symbol attached to a commodity from the reading window 12, and reads a commodity code for specifying the commodity by a general object recognition technology having been used from the past. Note that the scanner 13 may be a scanning type scanner that scans a code symbol attached to a commodity with a laser beam passing through the reading window 12 to read a commodity code included in the code symbol.

Further, the registration apparatus 10 includes an operator display 14, a printer 15, a customer display 16, and a card reader 17. The operator display 14 displays information of commodities registered and various pieces of information for assisting a commodity registration performed by a store clerk. A touch panel 18 is provided on the surface of the operator display 14. The touch panel 18 receives an input of information and the like necessary for a commodity registration of a commodity to which a code symbol such as a bar code is not attached.

The printer 15 prints transaction information of the commodity registered and the like on a receipt sheet and issues a receipt and the like as necessary. For example, when the customer purchases a commodity with a gift certificate, the payment is completed when the store clerk receives the gift certificate, and thus the printer 15 provided in the registration apparatus 10 issues a receipt. The customer display 16 displays, to the customer, information of the commodity registered, a total amount, and the like. The card reader 17 reads a member card or a point card of a store.

Figure 3:
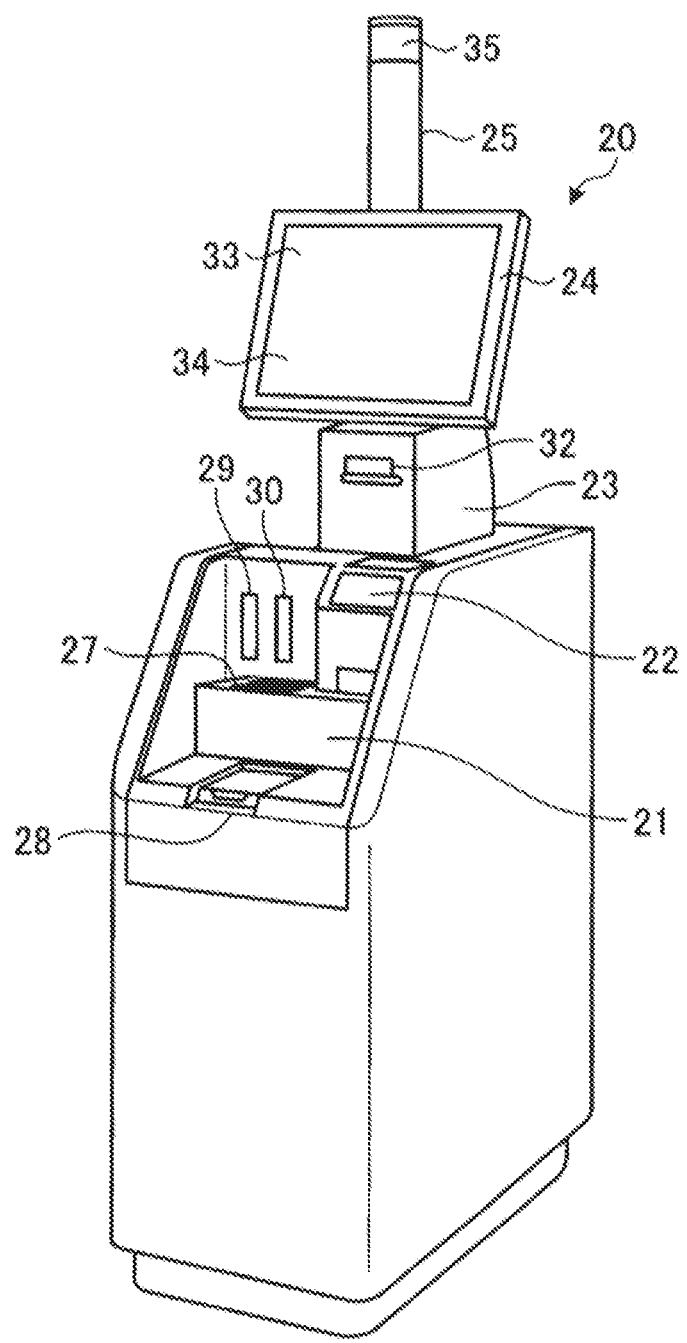
FIG. 3 is a view showing an appearance of the accounting apparatus according to the first embodiment.

FIG. 3 is a view showing the appearance of the accounting apparatus 20. As shown in FIG. 3, the accounting apparatus 20 includes a cash depositing and dispensing device 21, a card reader and writer 22, a printer 23, a display and operation panel 24, a support 25, and a change machine 26 (see FIG. 4). The cash depositing and dispensing device 21 includes a coin depositing unit 27, a coin dispensing unit 28, a bill depositing unit 29, and a bill dispensing unit 30.

The coin depositing unit 27 is a depositing port for receiving insertion of coins paid by a customer. The coin dispensing unit 28 is a receiving tray for receiving the change dispensed from a dispensing port (not shown), the coins returned without being received among the coins inserted from the coin depositing unit 27, and the like. The bill depositing unit 29 is a depositing port for receiving insertion of bills paid by a customer. The bill dispensing unit 30 is a dispensing port for bills dispensed as change. A first sensor (hereinafter, referred to as a change dispensing port sensor) 31 (see FIG. 4) is provided in each of the dispensing port for dispensing the above-mentioned change of coins and the bill dispensing unit 30. Those change dispensing port sensors 31 each include a light emitting element and a light receiving element facing each other, and detect the presence or absence of change passing through the dispensing port and the bill dispensing unit 30. Here, for example, the change machine 26 includes a conveying mechanism 261 for conveying cash for payment of change (see FIG. 4). The change dispensing port sensors 31 constitute a first detection unit for detecting a malfunction (conveyance malfunction) of the conveying mechanism 261 of the change machine 26, together with a controller 200 of the accounting apparatus 20 (see FIG. 4). Specifically, each change dispensing port sensor 31 outputs a signal to the controller 200 of the accounting apparatus 20 if the change dispensing port sensor 31 does not recognize the passage of change within a predetermined period of time after a change dispensing instruction is issued from the controller 200 of the accounting apparatus 20 to the change machine 26. Upon receiving the signal, the controller 200 of the accounting apparatus 20 determines that a malfunction has occurred in the conveying mechanism 261 of the change machine 26.

The card reader and writer 22 reads and writes information from and to an electronic money card or a point card by near field communication or the like, and reads membership information from a member card. The printer 23 issues a receipt, on which transaction information and the like are printed, from a receipt issuing port 32 under the control of the controller 200 of the accounting apparatus 20.

The display and operation panel 24 includes a display 33 and a touch panel 34. The display 33 includes, for example, a liquid crystal panel, and functions as a display unit for displaying an operation screen and various types of information such as commodity information of commodities registered. The touch panel 34 is provided on the surface of the display 33 to input information corresponding to a touched position to the controller 200 of the accounting apparatus 20 (see FIG. 4), and functions as an operation input unit for inputting an operation of a user. The support 25 includes the display and operation panel 24 attached thereto and an indication lamp 35 on the upper end thereof. The indication lamp 35 is an electric lamp that is turned on when a trouble occurs in the accounting apparatus 20, thus notifying the store clerk of the occurrence of the trouble.

When a customer pays for a commodity in cash, the change machine 26 receives the bills and coins paid by the customer and pays the customer change as necessary. In addition to the above-mentioned conveying mechanism 261, the change machine 26 includes storage units 262 to stock the received bills and coins by denominations. Each of the storage units 262 of the change machine 26 includes a second sensor (hereinafter, referred to as a change sensor) 36 (see FIG. 4). The change sensors 36 are provided at the inlets of the respective storage units 262, through which the cash inserted into the coin depositing unit 27 and the bill depositing unit 29 passes, and at the outlets of the respective storage units 262, through which the cash stored in the storage units 262 passes when dispensed as change. Those change sensors 36 each include a light emitting element and the light receiving element facing each other, and detect the presence or absence of cash passing through the inlets and outlets of the respective storage units 262. The change sensors 36 constitute a second detection unit for detecting the shortage of cash for change, together with the controller 200 of the accounting apparatus 20 (see FIG. 4). More specifically, each change sensor 36 outputs a signal to the controller 200 of the accounting apparatus 20 every time cash passes, and the controller 200 recognizes the number of bills or coins for each denomination stocked in each storage unit 262 on the basis of the signal. The controller 200 of the accounting apparatus 20 then determines the shortage of cash for change when the recognized number of bills or coins for each denomination is equal to or less than a predetermined value (threshold value).

Figure 4:
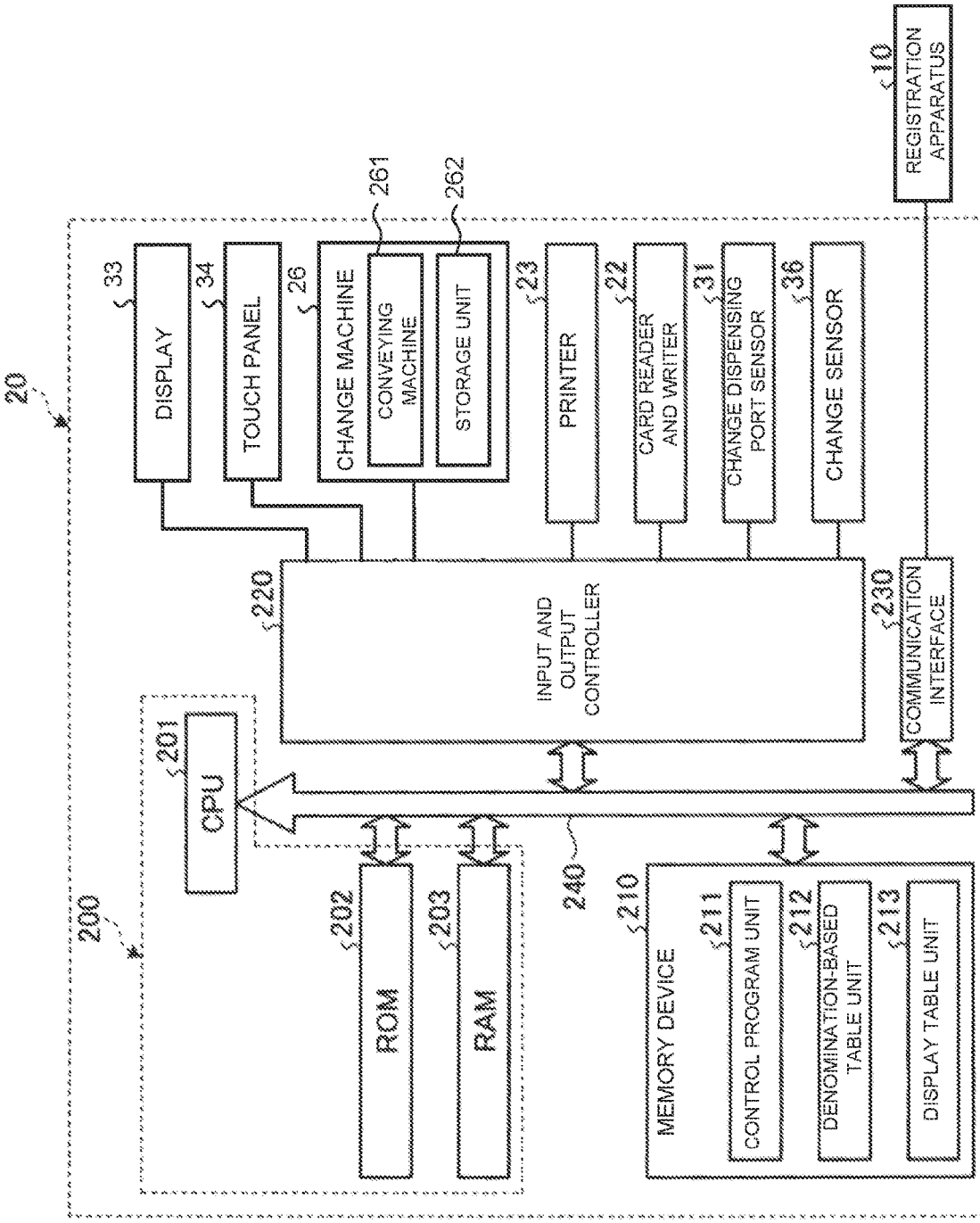
FIG. 4 is a block diagram showing a hardware configuration of the accounting apparatus according to the first embodiment.

Next, the hardware configuration of the accounting apparatus 20 will be described with reference to FIG. 4. The accounting apparatus 20 includes the controller 200, a memory device 210, an input and output controller 220, a communication interface (I/F) 230, and the like. The controller 200, the memory device 210, and the input and output controller 220 are connected to one another via a bus 240.

The controller 200 includes a central processing unit (CPU) 201, a read only memory (ROM) 202, and a random access memory (RAM) 203. The CPU 201, the ROM 202, and the RAM 203 are connected to one another via the bus 240. The CPU 201 controls the entire accounting apparatus 20. The ROM 202 stores various programs including programs to be used for driving the CPU 201 and various types of data. The RAM 203 is used as a work area of the CPU 201 and expands various programs and various types of data stored in the ROM 202 and the memory device 210. The controller 200 executes various types of control processing for the accounting apparatus 20 by the CPU 201 operating according to a control program stored in the ROM 202 or the memory device 210 and expanded in the RAM 203.

The memory device 210 includes a control program unit 211, a denomination-based table unit 212, and a display table unit 213. The control program unit 211 is an area for storing various control programs. The denomination-based table unit 212 is an area for storing a denomination-based table 212a shown in FIG. 5. The denomination-based table 212a stores a denomination, the number of stocked bills or coins, and a threshold value in association with one another. The number of stocked bills or coins is updated on the basis of information from the change sensors 36 every time a transaction is completed. The threshold value is predetermined for each denomination in order to determine the shortage of change. The display table unit 213 is an area for storing a display table 213a shown in FIG. 6. The display table 213a stores in advance a display No., a status of the change machine, and payment methods 1 to 4 in association with one another. The display No. is a number for specifying the content to be displayed on the display 33. The status of the change machine indicates a factor for which the change fails to be paid. The payment methods 1 to 4 indicate alternative means of paying change in cash. Note that in the following description, paying a customer change in cash may be referred to as dispensing change.

Referring back to FIG. 4, the input and output controller 220 is connected to the display 33, the touch panel 34, the change machine 26, the printer 23, the card reader and writer 22, the change dispensing port sensors 31, and the change sensors 36. Thus, the controller 200 is capable of transmitting and receiving data to and from the display 33, the touch panel 34, the change machine 26, the printer 23, the card reader and writer 22, the change dispensing port sensors 31, and the change sensors 36 via the input and output controller 220. The communication I/F 230 is connected to the registration apparatus 10. Thus, the controller 200 is capable of transmitting and receiving data to and from the registration apparatus 10.

Next, the functional configurations of the controller 200 of the accounting apparatus 20 will be described with reference to FIG. 7. The CPU 201 operates according to a control program stored in the ROM 202 or the memory device 210, and thus the controller 200 functions as a transaction data acquisition unit 2001, a calculation unit 2002, a sensor information acquisition unit 2003, a determination unit 2004, a selection unit 2005, a display control unit 2006, an acceptance unit 2007, and a checkout processing unit 2008 shown in FIG. 7. Note that each of the above functional configurations may be achieved by hardware, and it suffices that the accounting apparatus 20 may have the above functions.

Figure 7:
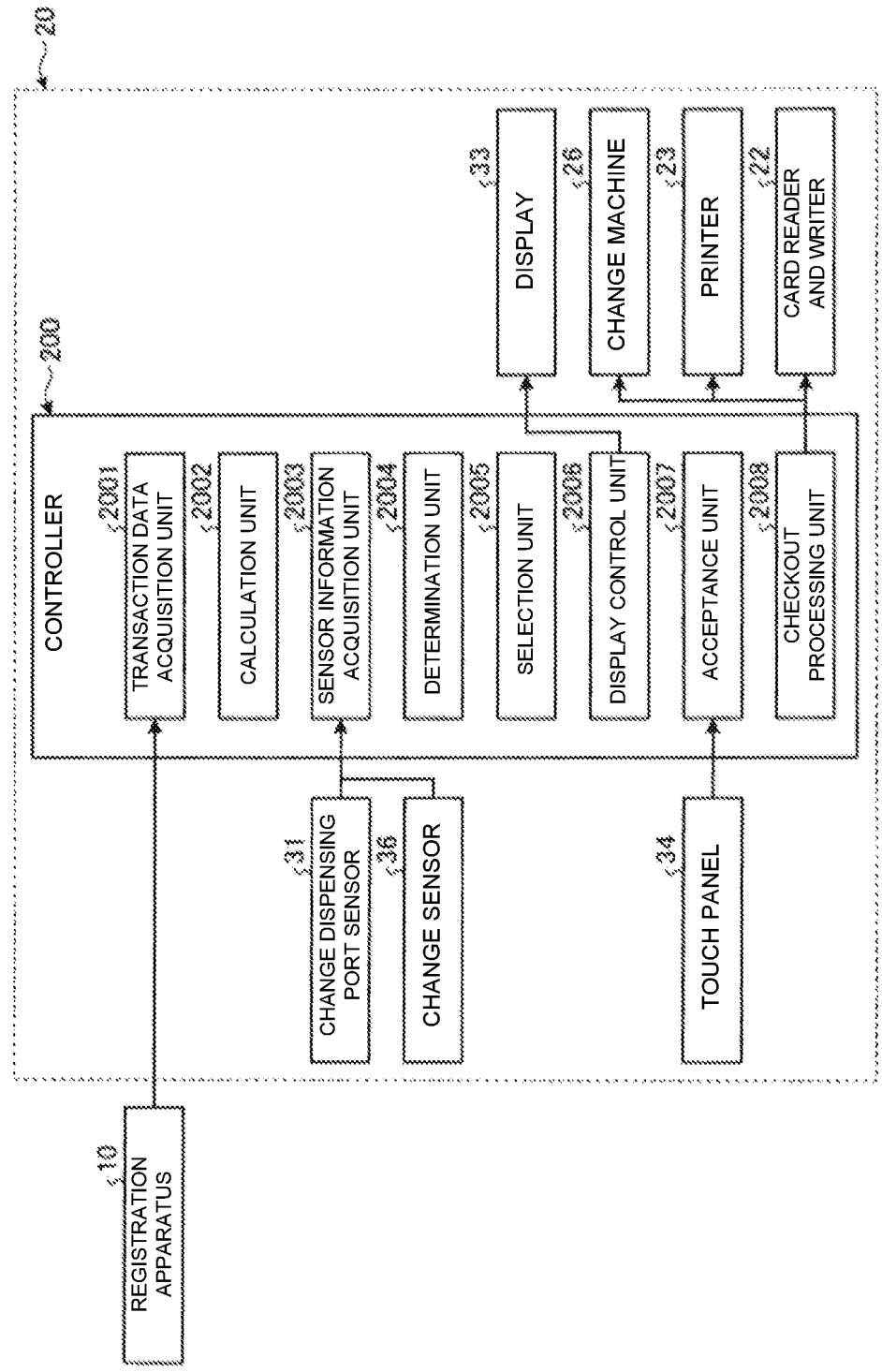
FIG. 7 is a block diagram showing a functional configuration of the accounting apparatus according to the first embodiment.

The transaction data acquisition unit 2001 of the controller 200 shown in FIG. 7 acquires transaction data from the registration apparatus 10. The transaction data is data necessary for the accounting apparatus 20 to perform accounting processing, and favorably includes the name of a commodity to be purchased in the transaction, the unit price thereof, the number of commodities, and the total amount of the transaction. The calculation unit 2002 of the controller 200 shown in FIG. 7 calculates the change amount from the total amount acquired by the transaction data acquisition unit 2001 and the amount deposited into the coin depositing unit 27 and/or the bill depositing unit 29.

The sensor information acquisition unit 2003 of the controller 200 shown in FIG. 7 acquires sensor information from the change dispensing port sensors 31 and the change sensors 36. The change dispensing port sensor 31 transmits a signal (sensor information) to the sensor information acquisition unit 2003 when the change dispensing port sensor 31 does not recognize the passage of change after a predetermined period of time has elapsed from the time when a change payment instruction is transmitted from the checkout processing unit 2008, which will be described later, to the change machine 26. Upon recognizing the passage of cash, the change sensor 36 transmits a signal (sensor information) to the sensor information acquisition unit 2003.

The determination unit 2004 of the controller 200 shown in FIG. 7 determines whether or not the change can be dispensed on the basis of detection results of the detection units. Specifically, upon receiving a signal from the change dispensing port sensor 31, the determination unit 2004 determines that a malfunction has occurred in the conveying mechanism 261 of the change machine 26, and determines that the change fails to be dispensed. Further, the determination unit 2004 compares the number of bills or coins stocked for each denomination, which is recognized on the basis of the signal from the change sensor 36 (the number of stocked bills or coins stored in the denomination-based table), with the change amount calculated by the calculation unit 2002. When the cash enough to pay the change is not stocked in the change machine 26, the determination unit 2004 determines the shortage of change, and determines that the change fails to be dispensed. Alternatively, the determination unit 2004 compares the number of stocked bills or coins stored in the denomination-based table with the threshold value determined in the denomination-based table. When the number of stocked bills or coins falls below the threshold value in any denomination, the determination unit 2004 determines the shortage of change, and determines that the change fails to be dispensed.

The selection unit 2005 of the controller 200 shown in FIG. 7 selects a change payment method selectable by the customer when the determination unit 2004 determines that the change fails to be dispensed. Specifically, when the determination unit 2004 determines that the change fails to be dispensed as a result of the shortage of change, the selection unit 2005 selects the payment methods 1 to 4 associated with the display No. 1 of the display table 213a (see FIG. 6) as the change payment methods selectable by the customer. That is, the selection unit 2005 selects four methods: electronic money charging-up, point charging-up with an amount equivalent to the change, printing of a voucher, and refunding and paying for purchase by another payment method. Further, when the determination unit 2004 determines that the change fails to be dispensed as a result of a malfunction of the change machine 26, the selection unit 2005 selects the payment methods 1 to 3 associated with the display No. 2 of the display table 213a as the change payment methods selectable by the customer. In such a manner, the selection unit 2005 selects different payment methods in accordance with the factor for which the change fails to be dispensed.

The display control unit 2006 of the controller 200 shown in FIG. 7 displays various types of information on the display 33. The various types of information include, for example, the change payment method selected by the selection unit 2005 described above, and the transaction data acquired by the transaction data acquisition unit 2001. The acceptance unit 2007 of the controller 200 shown in FIG. 7 accepts the payment method for purchase selected by the customer. Further, when the determination unit 2004 determines that the change fails to be dispensed, the acceptance unit 2007 accepts a payment method selected by the customer from a plurality of change payment methods other than paying in cash. Specifically, the acceptance unit 2007 accepts a payment method selected by the customer among the change payment methods selected by the selection unit 2005 and displayed on the display 33 by the display control unit 2006. When the customer touches a desired payment method among the payment methods displayed on the display 33, the acceptance unit 2007 accepts information indicating the payment method from the touch panel 34.

The checkout processing unit 2008 of the controller 200 shown in FIG. 7 performs change payment processing according to the payment method accepted by the acceptance unit 2007. Specifically, the checkout processing unit 2008 outputs an instruction signal to the change machine 26, the printer 23, the card reader and writer 22, and the like such that the payment method accepted by the acceptance unit 2007 is executed. For example, when the acceptance unit 2007 accepts electronic money charging-up, the checkout processing unit 2008 outputs an instruction to write the change amount to the card reader and writer 22. When the acceptance unit 2007 accepts point charging-up, the checkout processing unit 2008 calculates the points equivalent to the change amount and outputs an instruction to write the calculated points to the card reader and writer 22. Further, when the acceptance unit 2007 accepts printing of a voucher, the checkout processing unit 2008 instructs the printer 23 to print the voucher. When the acceptance unit 2007 accepts refunding and paying for purchase by another payment method, the checkout processing unit 2008 outputs an instruction to refund the cash received in the change machine 26, and outputs an instruction for the display control unit 2006 to display a selection screen of the payment for purchase on the display 33.

The processing performed by the controller 200 in the accounting apparatus 20 described above will be described with reference to the flowcharts of FIGS. 8A, 8B, 12A, and 12B. First, in Step S1 of FIG. 8A, the transaction data acquisition unit 2001 of the controller 200 determines whether or not transaction data has been acquired from the registration apparatus 10. If it is determined that the transaction data has not been acquired (No in Step S1), the controller 200 returns to Step S1 and waits. If it is determined that the transaction data has been acquired (Yes in Step S1), the processing of the controller 200 proceeds to Step S2. In Step S2, the display control unit 2006 of the controller 200 causes the display 33 to display a selection screen of the payment methods for purchase. As shown in FIG. 9, the selection screen displays three options of the payment methods, i.e., a button A of payment in "cash", a button B of payment by "credit card", and a button C of payment by "electronic money". The customer can select a payment method by touching any of the buttons A, B, and C displayed on the selection screen.

Figure 8A:
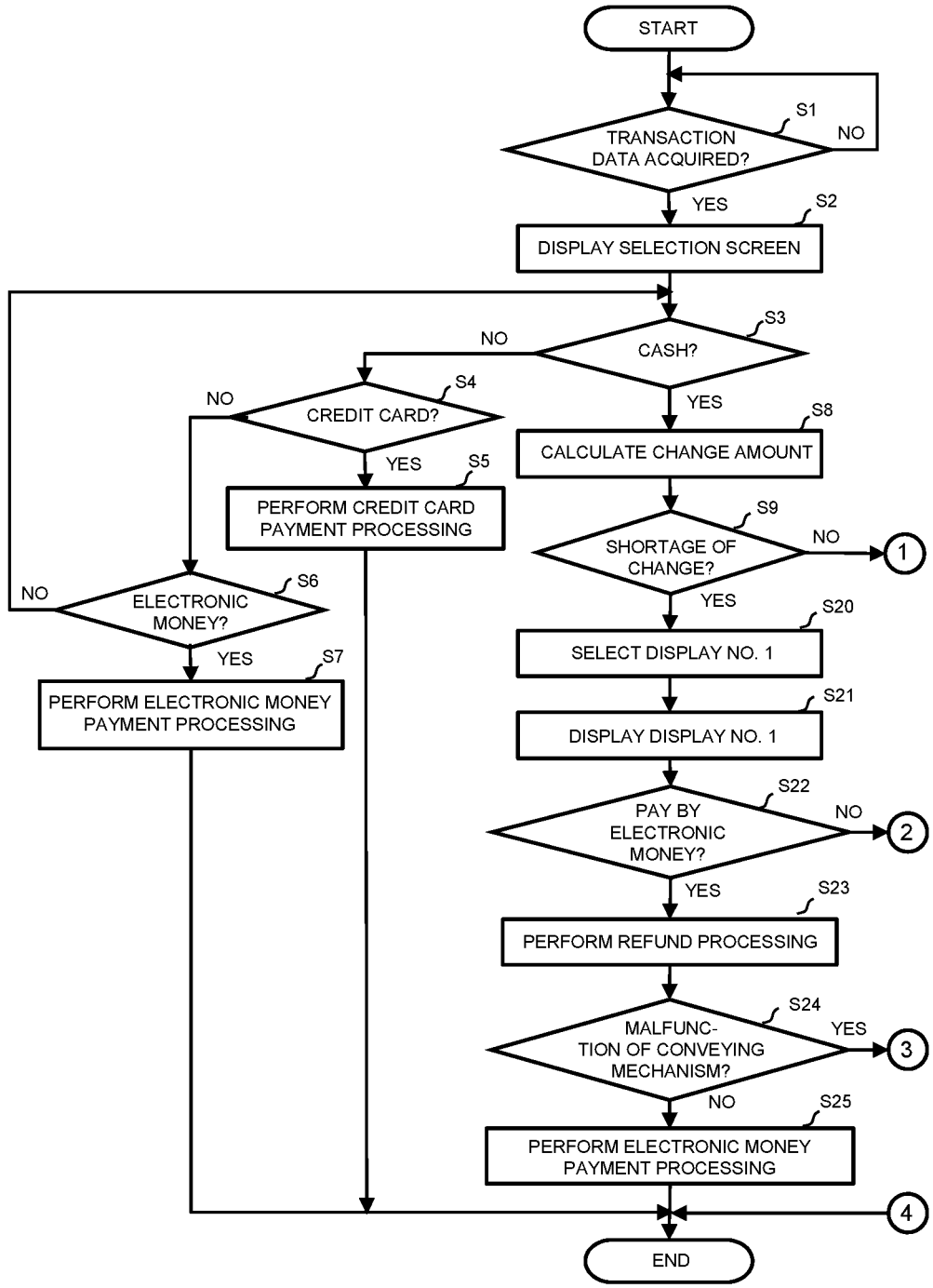
FIG. 8A is a flowchart showing the processing of a controller of the accounting apparatus according to the first embodiment.
Figure 9:
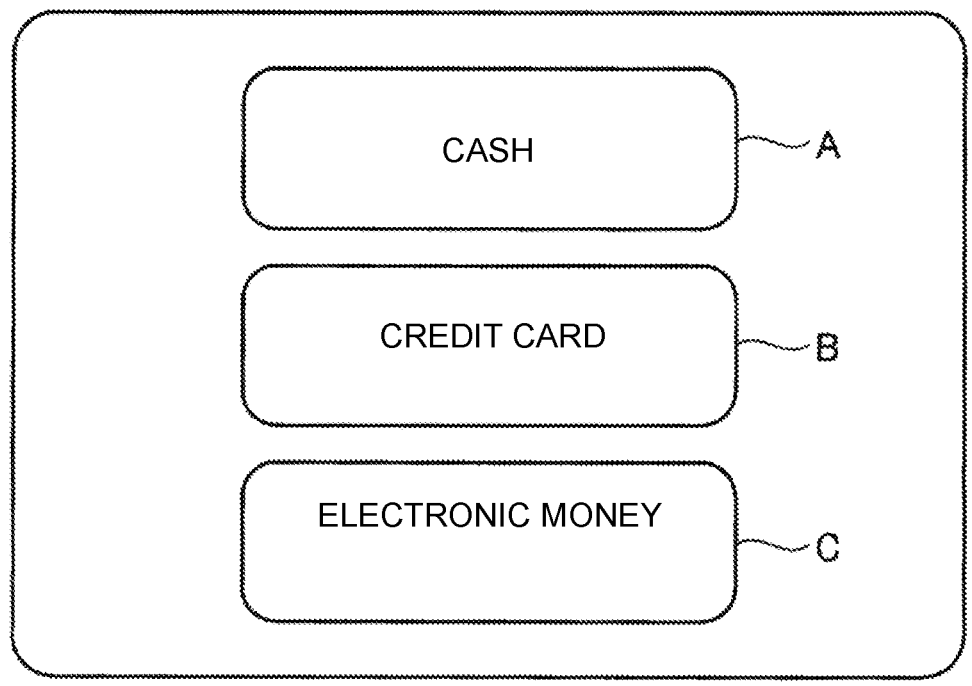
FIG. 9 is a diagram showing an example of a selection screen of payment methods for purchase, which is displayed by the accounting apparatus according to the first embodiment.

Next, in Step S3 of FIG. 8A, the acceptance unit 2007 of the controller 200 determines whether or not the payment in cash has been accepted. That is, the acceptance unit 2007 determines whether or not the customer has selected the payment in cash among the three payment methods for purchase displayed on the selection screen of FIG. 9. If it is determined that the payment in cash has not been accepted (No in Step S3), the processing of the controller 200 proceeds to Step S4. In Step S4, the acceptance unit 2007 of the controller 200 determines whether or not the payment by a credit card has been accepted. If it is determined that the payment by a credit card has been accepted (Yes in Step S4), the processing of the controller 200 proceeds to Step S5. In Step S5, the checkout processing unit 2008 of the controller 200 performs credit card payment processing. The credit card payment processing includes transmission and reception of data necessary for settlement to and from a settlement center of a credit card firm, an instruction to issue a receipt, and the like. If it is determined that the payment by a credit card has not been accepted (No in Step S4), the processing of the controller 200 proceeds to Step S6. In Step S6, the acceptance unit 2007 of the controller 200 determines whether or not the payment by electronic money has been accepted. If it is determined that the payment by electronic money has been accepted (Yes in Step S6), the processing of the controller 200 proceeds to Step S7. In Step S7, the checkout processing unit 2008 of the controller 200 performs electronic money payment processing. The electronic money payment processing includes a write instruction to the electronic money card, transmission and reception of data to and from an electronic money management company, which is performed as necessary, and the like. If it is determined in Step S6 that the payment by electronic money has not been accepted (No in Step S6), the processing of the controller 200 returns to Step S3.

If it is determined in Step S3 that the payment in cash has been accepted (Yes in Step S3), the processing of the controller 200 proceeds to Step S8. In Step S8, the calculation unit 2002 of the controller 200 calculates a change amount on the basis of the amount of cash deposited in the coin depositing unit 27 and/or the bill depositing unit 29 and the total amount of the transaction included in the transaction data acquired by the transaction data acquisition unit 2001. Next, in Step S9, the determination unit 2004 of the controller 200 determines whether or not the shortage of change has occurred on the basis of the calculated change amount and the number of bills or coins stocked for each denomination, which is recognized on the basis of the information from the change sensor 36. That is, the determination unit 2004 determines whether or not the calculated change amount can be paid with the stocked cash.

If it is determined that the shortage of change has not occurred (NO in Step S9), the processing of the controller 200 proceeds to Step S10. In Step S10 of FIG. 8B, it is determined whether or not the conveying mechanism 261 for dispensing change has a malfunction. If it is determined that the conveying mechanism 261 has no malfunction (No in Step S10), the processing of the controller 200 proceeds to Step S11. In Step S11, the checkout processing unit 2008 of the controller 200 outputs an instruction to dispense the change to the change machine 26, and terminates the processing of FIGS. 8A and 8B. That is, when the shortage of change has not occurred and the conveying mechanism 261 has no malfunction, the determination unit 2004 of the controller 200 determines that the change can be dispensed. On the other hand, in Step S10, if it is determined that the conveying mechanism 261 has a malfunction and that the change fails to be dispensed (Yes in Step S10), the processing of the controller 200 proceeds to Step S12. In Step S12, the selection unit 2005 of the controller 200 selects the display No. 2 by referring to the display table 213a of FIG. 6. That is, the selection unit 2005 selects the payment methods 1 to 3 (see FIG. 6) that can be processed by the accounting apparatus 20 as alternative means of dispensing the change in cash in the case where the conveying mechanism 261 has a malfunction (in the case of a conveyance malfunction).

Figure 10:
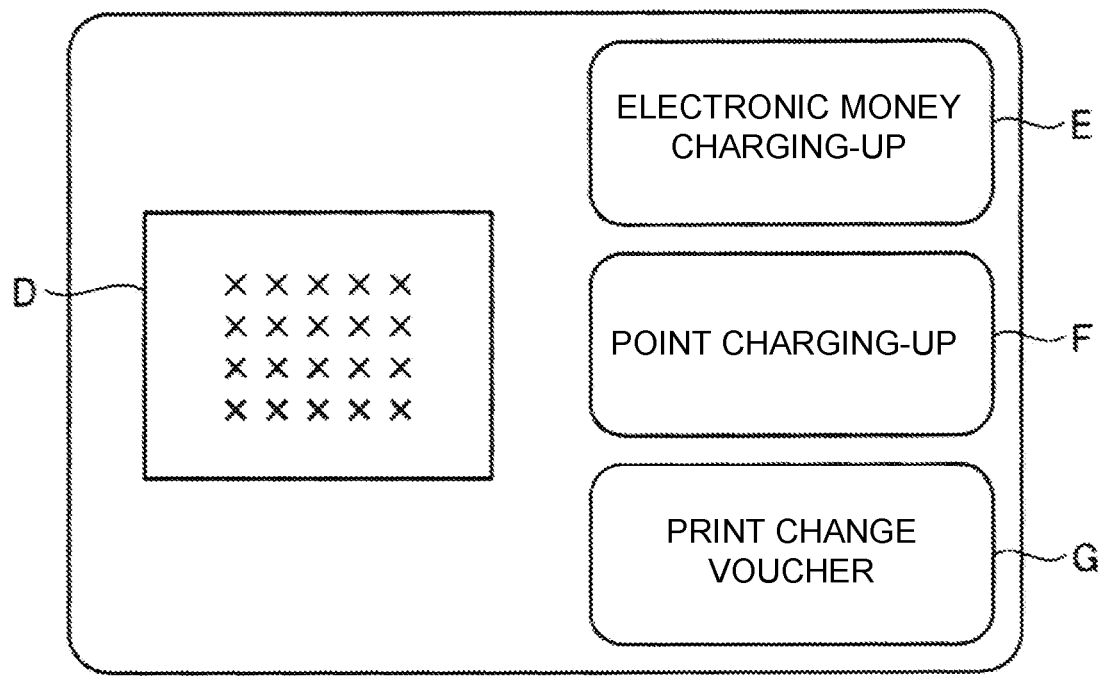
FIG. 10 is a diagram showing an example of an alternative method display screen displayed by the accounting apparatus according to the first embodiment.

Next, in Step S13, the display control unit 2006 of the controller 200 causes the display 33 to display the change payment method selected by the selection unit 2005. FIG. 10 shows the display screen of the change payment methods at that time. The display screen displays an explanation display section D and three buttons E, F, and G indicating alternative means of dispensing the change in cash. The explanation display section D displays a message, for example, "Sorry. The change cannot be paid now. Please select a corresponding method from the right." The button E of "electronic money charging-up" is a button for selecting charging-up of an electronic money card owned by a customer with the change. The button F of "point charging-up" is a button for selecting charging-up a point card owned by a customer with points equivalent to the change. The button G of "printing a change voucher" is a button for selecting printing of a voucher with which the change can be received in cash at the service counter of the store.

Figure 8B:
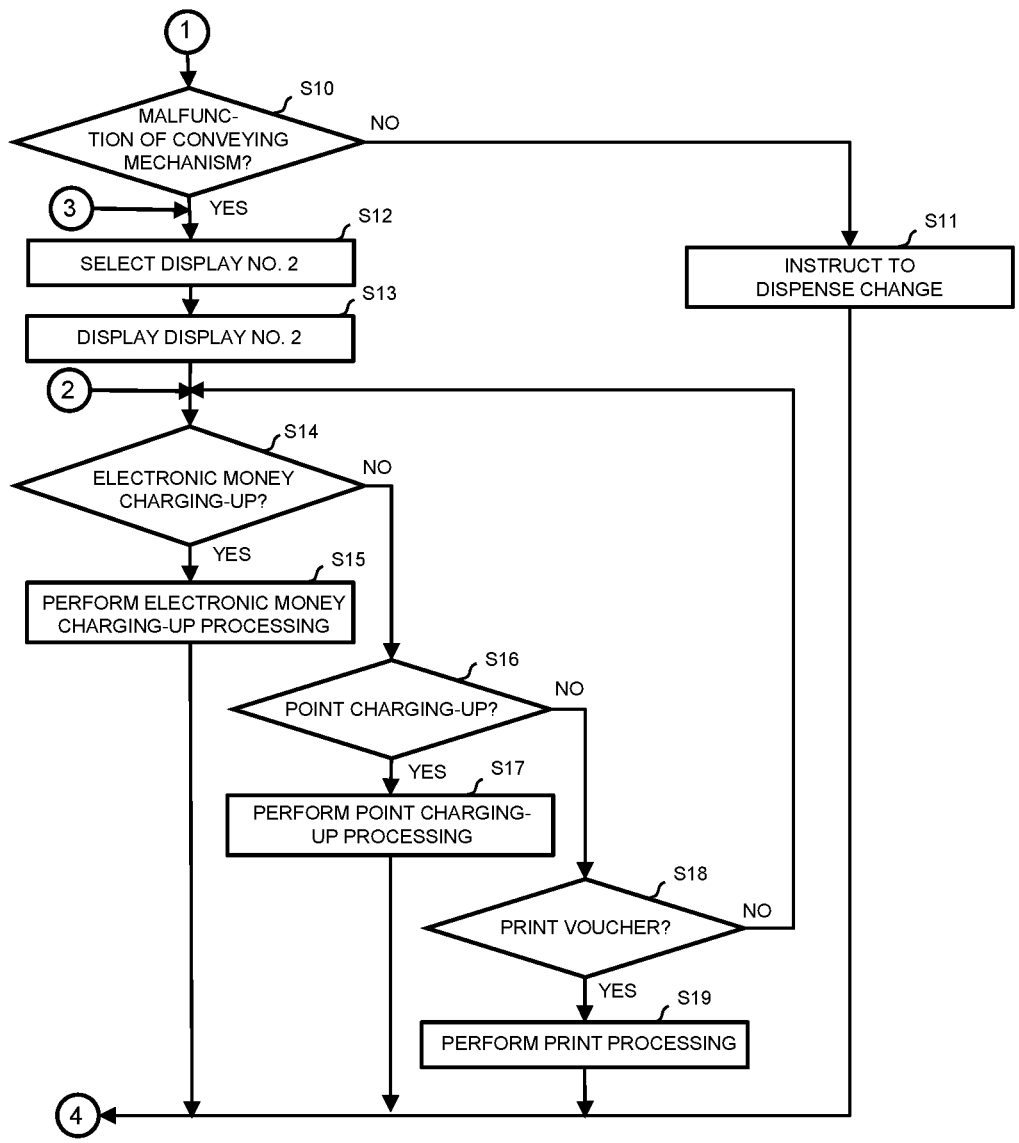
FIG. 8B is a flowchart showing the processing of a controller of the accounting apparatus according to the first embodiment.

Referring back to the description of FIG. 8B, in Step S14, the controller 200 determines whether or not the electronic money charging-up has been accepted. That is, the controller 200 determines whether or not the button E of "electronic money charging-up" has been touched. If it is determined that the electronic money charging-up has been accepted (Yes in Step S14), the processing of the controller 200 proceeds to Step S15. In Step S15, the checkout processing unit 2008 of the controller 200 performs electronic money charging-up processing, and terminates the processing of FIGS. 8A and 8B. The electronic money charging-up processing includes a write instruction to the card reader and writer 22, transmission and reception of data to and from the electronic money management company, which is performed as necessary, and the like. The card reader and writer 22 writes the amount of change to the electronic money card of the customer on the basis of the write instruction. Although detailed description is omitted, when the button E of "electronic money charging-up" is touched, a display for the customer to select the type of electronic money is shown. The controller 200 performs write processing according to the type of electronic money selected by the customer. Before the card reader and writer 22 writes, the controller 200 checks the balance of the electrical money card and checks if the balance stored in the electronic money card does not exceed the upper limit when the electronic money card is charged up with the change. If the balance exceeds the upper limit, the display control unit 2006 of the controller 200 causes the display 33 to display a message prompting the customer to select another alternative method.

If it is determined in Step S14 that the electronic money charging-up has not been accepted (No in Step S14), the processing of the controller 200 proceeds to Step S16. In Step S16, the controller 200 determines whether or not the point charging-up has been accepted. That is, the controller 200 determines whether or not the button F of "point charging-up" has been touched. If it is determined that the point charging-up has been accepted (Yes in Step S16), the processing of the controller 200 proceeds to Step S17. In Step S17, the checkout processing unit 2008 of the controller 200 performs point charging-up processing, and terminates the processing of FIGS. 8A and 8B. The point charging-up processing includes calculation of points equivalent to the change, a write instruction to the card reader and writer 22, and the like. The card reader and writer 22 writes the calculated points to the electronic money card of the customer on the basis of the write instruction.

If it is determined in Step S16 of FIG. 8B that the point charging-up has not been accepted (NO in Step S16), the processing of the controller 200 proceeds to Step S18. In Step S18, the controller 200 determines whether or not the printing of a voucher has been accepted. That is, the controller 200 determines whether or not the button G of "printing a change voucher" has been touched. If it is determined that the printing of a voucher has not been accepted (No in Step S18), the processing of the controller 200 returns to Step S14. If it is determined that the printing of a voucher has been accepted (Yes in Step S18), the processing of the controller 200 proceeds to Step S19. In Step S19, the checkout processing unit 2008 of the controller 200 performs print processing, and terminates the processing of FIGS. 8A and 8B. The print processing includes a print instruction to the printer 23. The printer 23 prints a change voucher, in which the change amount is described, on the basis of the print instruction.

Further, if it is determined in Step S9 that the shortage of change has occurred (Yes in Step S9), the processing of the controller 200 proceeds to Step S20. In Step S20, the selection unit 2005 of the controller 200 selects the display No. 1 by referring to the display table 213a. That is, the selection unit 2005 selects the payment methods 1 to 4 (see FIG. 6) that can be processed by the accounting apparatus 20 as alternative means of dispensing the change in the case of the shortage of change.

Figure 11:
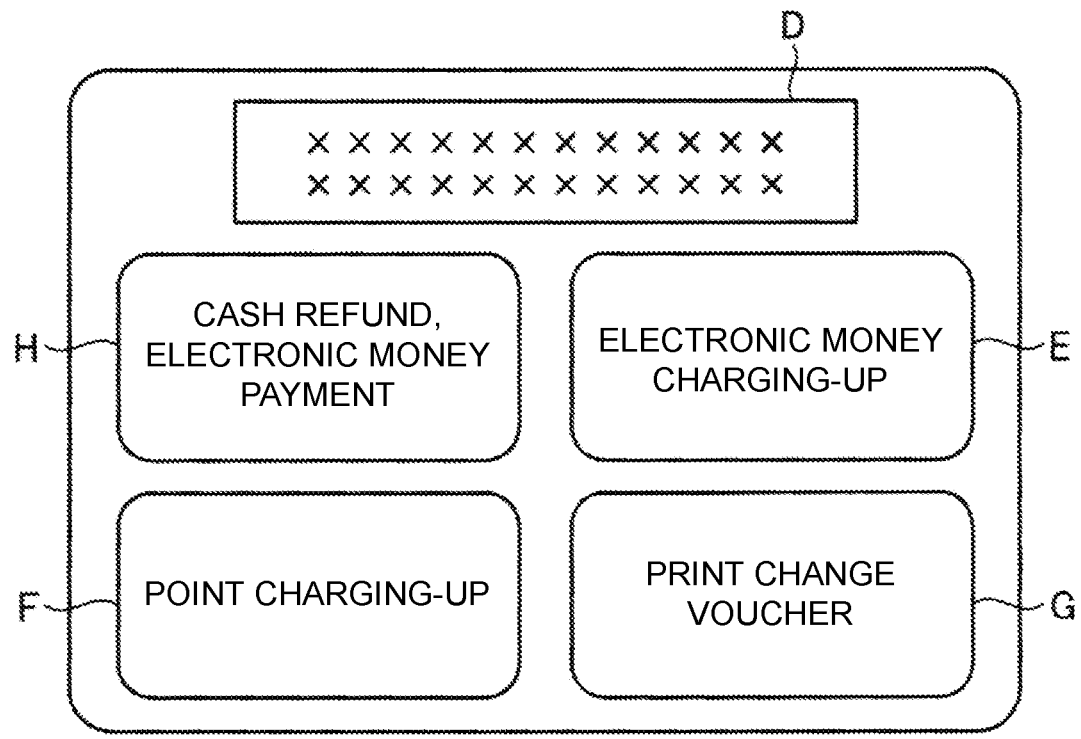
FIG. 11 is a diagram showing another example of the alternative method display screen displayed by the accounting apparatus according to the first embodiment.

In Step S21, the display control unit 2006 of the controller 200 causes the display 33 to display the change payment methods selected by the selection unit 2005. FIG. 11 shows the display screen of the change payment methods at that time. The displayed options having the same functions as those in FIG. 10 will be denoted by the same reference symbols, and descriptions thereof will be omitted. The display screen of FIG. 11 displays a button H of "cash refund, electronic money payment" in addition to the display screen of FIG. 10. The button H of "cash refund, electronic money payment" is a button for selecting the refund of the inserted cash and the switch to payment by electronic money. When the change fails to be dispensed due to the shortage of change, it is considered that the conveying mechanism 261 for dispensing change in cash has no malfunction and that the inserted cash can be dispensed. Therefore, the display screen displays the button H of "cash refund, electronic money payment".

Referring back to the description of FIG. 8A, in Step S22, the controller 200 determines whether or not the payment by electronic money has been accepted. That is, the controller 200 determines whether or not the button H of "cash refund, electronic money payment" has been touched. If it is determined that the payment by electronic money has not been accepted (No in Step S22), the processing of the controller 200 proceeds to Step S14. In Step S14 of FIG. 8B, the controller 200 performs change payment processing by another alternative method. If it is determined that the payment by electronic money has been accepted (Yes in Step S22), the processing of the controller 200 proceeds to Step S23. In Step S23 of FIG. 8A, the checkout processing unit 2008 of the controller 200 performs refund processing. The refund processing includes an instruction for the change machine 26 to drive the conveying mechanism 261 for dispensing the change in cash to refund the cash inserted by the customer. Subsequently, in Step S24, the determination unit 2004 of the controller 200 determines whether or not the conveying mechanism 261 has a malfunction. If it is determined that the conveying mechanism 261 has a malfunction (Yes in Step S24), the processing of the controller 200 proceeds to Step S12. In the case where the conveying mechanism 261 has a malfunction, since the inserted cash fails to be refunded to the customer, the display 33 displays the display No. 2 to prompt the customer to select another alternative method.

If it is determined in Step S24 that the conveying mechanism 261 has no malfunction (No in Step S24), the processing of the controller 200 proceeds to Step S25. In Step S25, the checkout processing unit 2008 of the controller 200 performs the electronic money payment processing, and terminates the processing of FIGS. 8A and 8B. Note that the electronic money payment processing is similar to the processing in Step S7. According to the above processing, the accounting apparatus 20 pays the customer the change by an alternative method when the change fails to be dispensed.

As described above, when it is detected that the change fails to be paid in cash, the accounting apparatus 20 of this embodiment accepts a plurality of change payment methods other than dispensing in cash, and performs the change payment processing. Therefore, it is possible to make a payment of change according to a customer's desire and a payment of change according to a status of the change machine 26. Further, the accounting apparatus 20 of this embodiment detects the number of bills or coins stocked for each denomination for paying change, and determines whether or not the change can be dispensed on the basis of the detected information and the amount information relating to the transaction. That is, the accounting apparatus 20 determines whether or not change can be dispensed for each transaction. Therefore, even in a situation where the amount of cash stocked in the accounting apparatus is small, it is possible to dispense change in cash as much as possible.

Furthermore, in order to determine whether or not the change can be dispensed, the accounting apparatus 20 of this embodiment uses the detection result of the sensor (change dispensing port sensor 31), which detects the status of the conveying mechanism 261, and the detection result of the sensor (change sensor 36), which detects the status of the cash for change. Thus, the accounting apparatus 20 can cope with the case where a factor for which change fails to be dispensed in cash is the shortage of change or a malfunction of the conveying mechanism 261. Moreover, since the change payment method selectable by the customer differs depending on the factor for which the change fails to be paid, the accounting apparatus 20 can provide an appropriate change payment method according to the factor.

Note that the accounting apparatus 20 receives an input of a change payment method in this embodiment, but the registration apparatus 10 may receive an input of a change payment method and the accounting apparatus 20 may accept the input. Further, although the accounting apparatus 20 has been described as being operated by a customer, the accounting apparatus 20 may be a general POS terminal operated by a store clerk, or may be a vending machine or the like. The accounting apparatus 20 detects the shortage of change and a malfunction of the conveying mechanism 261 in order to determine that the change fails to be dispensed, but the accounting apparatus 20 may detect any one of them.

Second Embodiment

Next, a second embodiment will be described with reference to FIGS. 12A and 12B. The second embodiment is an example applied to a so-called self-POS terminal in which a customer also performs a commodity registration. Detailed description of the configurations similar to those of the first embodiment will be omitted.

Figure 12A:
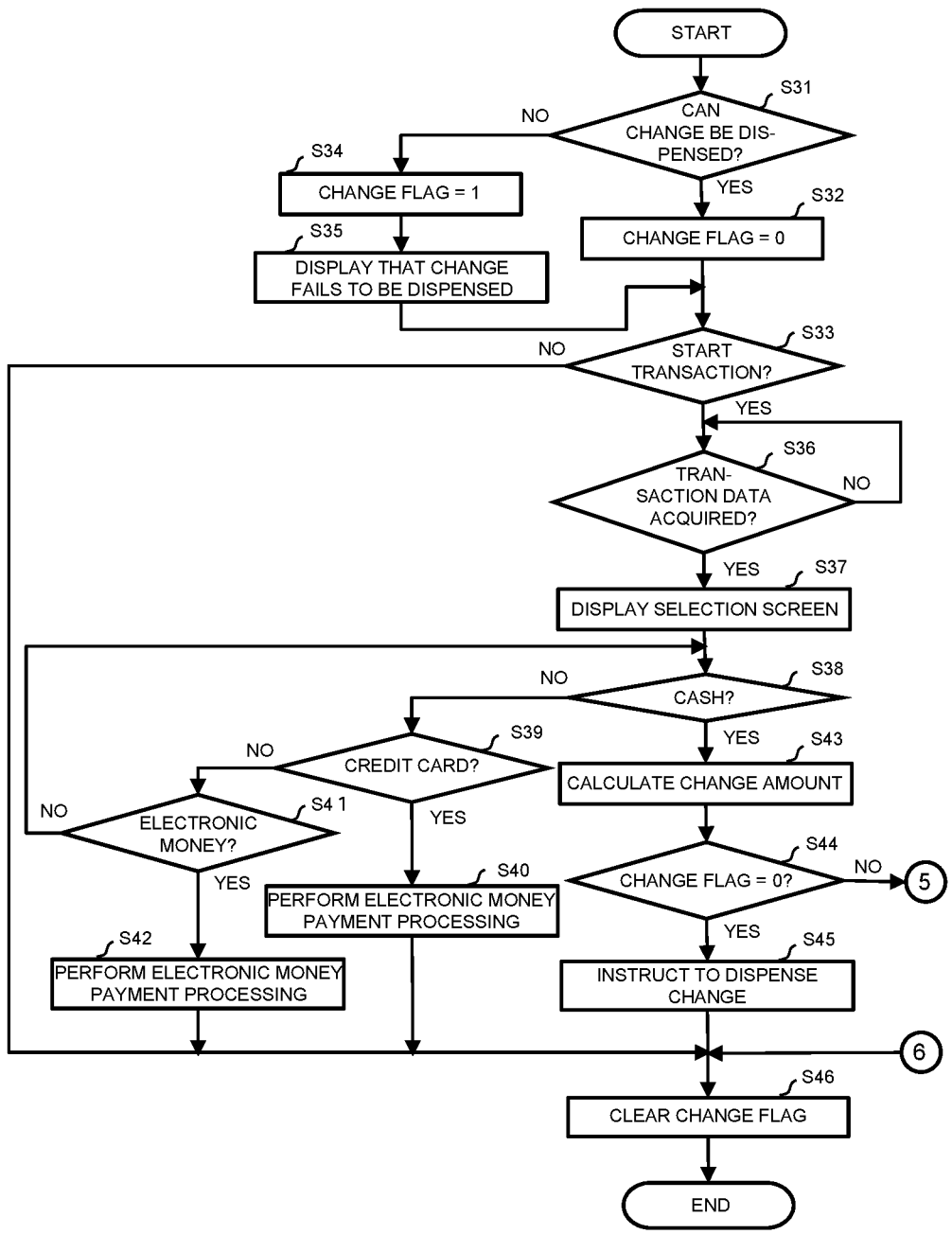
FIG. 12A is a flowchart showing the processing of a controller of an accounting apparatus according to a second embodiment.
Figure 12B:
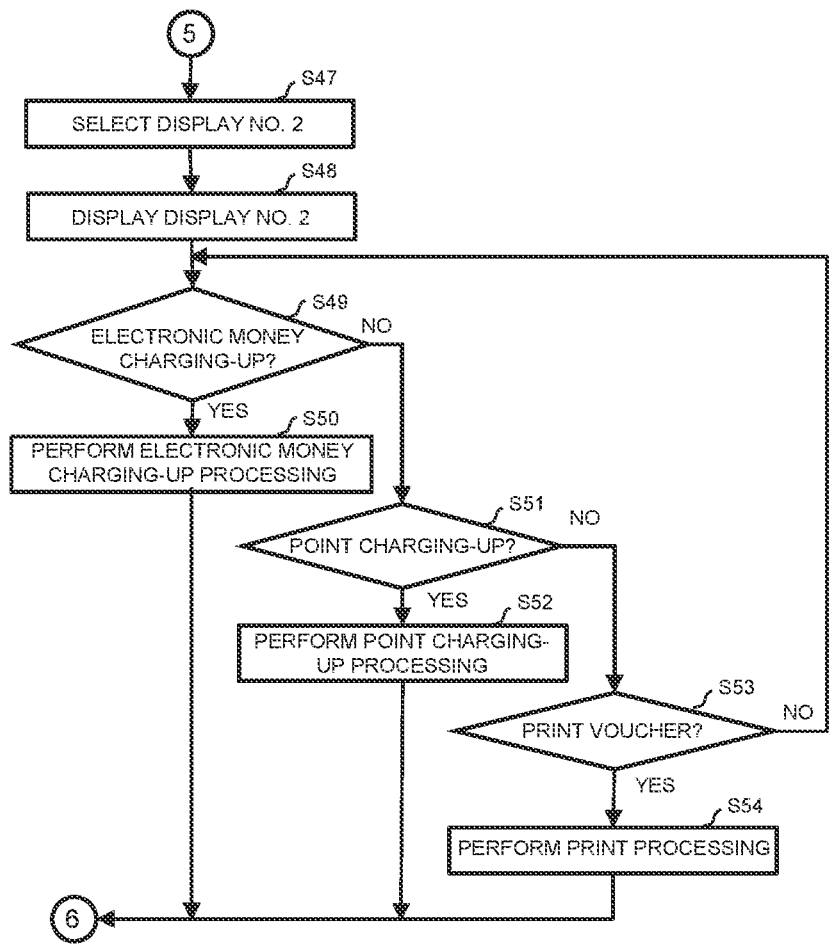
FIG. 12B is a flowchart showing the processing of a controller of an accounting apparatus according to a second embodiment.

FIGS. 12A and 12B is a flowchart showing processing performed by the controller 200 of the accounting apparatus 20. First, in Step S31 of FIG. 12A, the determination unit 2004 of the controller 200 determines whether or not the change can be dispensed after the payment by the customer is completed, that is, after one transaction is completed. Specifically, the determination unit 2004 compares the number of bills or coins stocked for each denomination, which is recognized by the change sensor 36 after one transaction is completed, with the threshold value stored in the denomination-based table shown in FIG. 5. Thus, the determination unit 2004 determines whether or not the shortage of change has occurred. Further, the determination unit 2004 determines whether or not the conveying mechanism 261 has a malfunction in the last transaction that has been completed. Thus, the determination unit 2004 determines the presence or absence of a malfunction of the conveying mechanism 261. If it is determined that the shortage of change has occurred or that the conveying mechanism 261 has a malfunction, the determination unit 2004 determines that the change fails to be dispensed in cash.

If it is determined in Step S31 that the change can be dispensed (Yes in Step S31), the processing of the controller 200 proceeds to Step S32. In Step S32, the controller control unit 200 sets a change flag to 0. The processing of the controller 200 then proceeds to Step S33. In Step S33, the acceptance unit 2007 of the controller 200 determines whether or not the start of the transaction has been accepted. That is, the controller 200 determines whether or not a transaction start button displayed on the display 33 is touched. If it is determined in Step S31 that the change fails to be dispensed (No in Step S31), the processing of the controller 200 proceeds to Step S34. In Step S34, the controller 200 sets the change flag to 1. Next, in Step S35, the display control unit 2006 of the controller 200 causes the display 33 to display a message indicating that the change fails to be dispensed. The controller 200 then proceeds to the processing of Step S33 described above. This makes it possible to inform the customer of the fact that the change fails to be dispensed, before the customer uses the self-POS terminal, that is, before the customer performs a commodity registration.

If it is determined that the start of the transaction has been accepted (Yes in Step S33), the processing of the controller 200 proceeds to Step S36. In Step S36, the controller 200 determines whether or not the transaction data acquisition unit 2001 has acquired the transaction data from a registration unit of the self-POS terminal. If it is determined that the transaction data has not been acquired (No in Step S36), the processing of the controller 200 returns to Step S36. If it is determined that the transaction data has been acquired (Yes in Step S36), the processing of the controller 200 proceeds to Step S37. In Step S37, the display control unit 2006 of the controller 200 causes the display 33 to display a selection screen of the payment methods for purchase.

Next, in Step S38, the controller 200 determines whether or not the acceptance unit 2007 accepts payment for purchase in cash. If it is determined that the payment in cash has not been accepted (No in Step S38), the processing of the controller 200 proceeds to Step S39. In Step S39, the acceptance unit 2007 of the controller 200 determines whether or not payment by a credit card has been accepted. If it is determined that the payment by a credit card has been accepted (Yes in Step S39), the processing of the controller 200 proceeds to Step S40. In Step S40, the checkout processing unit 2008 of the controller 200 performs credit card payment processing. If it is determined that the payment by a credit card has not been accepted (No in Step S39), the processing of the controller 200 proceeds to Step S41. In Step S41, the acceptance unit 2007 of the controller 200 determines whether or not the payment by electronic money has been accepted. If it is determined that the payment by electronic money has been accepted (Yes in Step S41), the processing of the controller 200 proceeds to Step S42. In Step S42, the checkout processing unit 2008 of the controller 200 performs electronic money payment processing (Step S42). If it is determined that the payment by electronic money has not been accepted (No in Step S41), the processing of the controller 200 returns to Step S38.

If it is determined in Step S38 that the payment in cash has been accepted (Yes in Step S38), the processing of the controller 200 proceeds to Step S43. In Step S43, the calculation unit 2002 of the controller 200 calculates the change amount on the basis of the amount of the inserted cash and the total amount of the transaction acquired by the transaction data acquisition unit 2001. Next, in Step S44, the controller 200 determines whether or not the change flag is set to 0. When it is determined that the change flag is set to 0 (Yes in Step S44), the processing of the controller 200 proceeds to Step S45. In Step S45, the checkout processing unit 2008 of the controller 200 outputs an instruction to dispense the change to the change machine 26. In Step S46, the checkout processing unit 2008 then clears the change flag and terminates the processing. That is, the accounting apparatus 20 dispenses the change if the change can be dispensed in cash.

If it is determined in Step S44 that the change flag is not set to 0 (NO in Step S44), the processing of the controller 200 proceeds to Step S47. In Step S47 of FIG. 12B, the selection unit 2005 of the controller 200 selects the display No. 2 by referring to the display table. In Step S48, the display control unit 2006 of the controller 200 causes the display 33 to display the selected change payment method. Subsequently, in Step S49, the controller 200 determines whether or not electronic money charging-up has been accepted. If it is determined that the electronic money charging-up has been accepted (Yes in Step S49), the processing of the controller 200 proceeds to Step S50. In Step S50, the checkout processing unit 2008 of the controller 200 performs electronic money charging-up processing. Next, the processing of the controller 200 proceeds to Step S46.

If it is determined in Step S49 that the electronic money charging-up has not been accepted (NO in Step S49), the processing of the controller 200 proceeds to Step S51. In Step S51, the controller 200 determines whether or not point charging-up has been accepted. If it is determined that the point charging-up has been accepted (Yes in Step S51), the processing of the controller 200 proceeds to Step S52. In Step S52, the checkout processing unit 2008 of the controller 200 performs point charging-up processing. Next, the processing of the controller 200 proceeds to Step S46.

If it is determined in Step S51 that the point charging-up has not been accepted (NO in Step S51), the processing of the controller 200 proceeds to Step S53. In Step S53, the controller 200 determines whether or not printing of a voucher has been accepted. When it is determined that the printing of a voucher has not been accepted (NO in Step S53), the processing of the controller 200 returns to Step S49. If it is determined that the printing of a voucher has been accepted (Yes in Step S53), the processing of the controller 200 proceeds to Step S54. In Step S54, the checkout processing unit 2008 of the controller 200 performs print processing. Next, the processing of the controller 200 proceeds to Step S46. If it is determined in Step S33 that the start of the transaction has not been accepted (NO in Step S33), the processing of the controller control unit 200 proceeds to Step S46. According to the above processing, the accounting apparatus 20 pays the customer the change by an alternative method when the change fails to be dispensed.

As described above, according to the accounting apparatus 20 of this embodiment, it is possible to pay change according to a user's desire and a status of the change machine as in the first embodiment. Further, according to the accounting apparatus 20 of this embodiment, it is possible to display a message indicating that the change fails to be dispensed, before a customer starts to use the self-POS terminal. This allows the customer to select whether to receive change in another way instead of dispensing change or to perform accounting at another self-POS terminal, which is highly convenient for the customer.

In the above-mentioned embodiments, the control program used in the accounting apparatus 20 may be configured to be provided by being recorded on a computer-readable recording medium such as a CD-ROM. Further, the control program executed by the accounting apparatus of each embodiment may be configured to be provided by being stored on a computer connected to a network such as the Internet and downloaded via the network, or may be configured to be provided via a network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An accounting apparatus that performs accounting processing on a basis of transaction data including payment for purchase, the accounting apparatus comprising:
a change machine that stocks cash and is configured to dispense the stocked cash in an amount equal to change that is owed to a customer who has made the payment for purchase in cash;
a detection device configured to detect a status of the change machine;
a display; and
a controller configured to:
determine whether or not the change machine is capable of dispensing the stocked cash in the amount equal to the change that is owed to the customer who has made the payment for purchase in cash on a basis of a result of the detection by the detection device,
display, in response to determining that the change machine is not capable of dispensing the stocked cash in the amount equal to the change that is owed to the customer who has made the payment for purchase in cash, a selection screen on the display through which the customer can make a selection of a change payment method from a plurality of payment methods, the plurality of payment methods including electronic money, and in response to determining that the customer has selected the electronic money payment method on the selection screen, perform refund processing by instructing the change machine to return the payment for purchase that was made in cash to the customer, and perform payment processing by processing the payment for purchase with electronic money, wherein the change machine includes a conveying mechanism that conveys the stocked cash that is dispensed from the change machine, and the detection device includes a first sensor that detects a status of the conveying mechanism of the change machine, and a second sensor that detects a status of each denomination of cash that the change machine is configured to stock, and the controller is further configured to:

determine whether a factor for the change machine not being able to dispense the stocked cash in the amount equal to the change that is owed to the customer is a malfunction of the conveying mechanism detected by the first sensor or a shortage of a particular denomination of cash that is needed for the change, detected by the second sensor, and change the payment methods selectable by the customer on the selection screen, in accordance with a result of the determination for the factor.

2. The accounting apparatus according to claim 1, further comprising a denomination-based table that stores a denomination of the cash, the number of stocked bills or coins for each denomination of the cash, and a predetermined threshold value for each denomination of the cash, in association with one another, wherein the controller is configured to:

update the number of stocked bills or coins for each denomination of cash in the denomination-based table on a basis of the information from the second sensor, and determine whether or not the change can be paid in cash on a basis of a result of comparing the number of stocked bills or coins for each denomination of the cash in the denomination-based table and the threshold value.

3. The accounting apparatus according to claim 1, further comprising:

a display table that stores in advance the factor for the change machine not being able to dispense the stocked cash in the amount equal to the change that is owed to the customer, and the change payment methods in association with each other, wherein the controller is configured to include in the selection screen, payment methods that are associated in the display table with the factor that the change machine is not able to dispense the stocked cash in the amount equal to the change that is owed to the customer, as the payment methods the customer can select.

4. The accounting apparatus according to claim 1, further comprising:

a printer, wherein the plurality of payment methods selectable by the customer on the selection screen includes printing of a change voucher, and the controller is configured to, in response to determining that the customer has selected the printing of the change voucher on the selection screen, instruct the printer to print the change voucher.

5. The accounting apparatus according to claim 1, wherein the change machine is configured to accept cash from the customer who is making the payment for purchase in cash, store the accepted cash therein, and dispense the stocked cash in the amount equal to the change that is owed to the customer.

* * * * *